(12) United States Patent
Hayama et al.

(10) Patent No.: US 11,867,312 B2
(45) Date of Patent: Jan. 9, 2024

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Toshinori Kanzaki, Tokyo (JP); Wataru Takahashi, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 65 days.

(21) Appl. No.: 17/600,536

(22) PCT Filed: Apr. 2, 2020

(86) PCT No.: PCT/JP2020/015183
§ 371 (c)(1),
(2) Date: Sep. 30, 2021

(87) PCT Pub. No.: WO2020/204137
PCT Pub. Date: Oct. 8, 2020

(65) Prior Publication Data
US 2022/0170564 A1 Jun. 2, 2022

(30) Foreign Application Priority Data

Apr. 4, 2019 (JP) .................................. 2019-071838

(51) Int. Cl.
*F16K 31/06* (2006.01)
*G05D 16/20* (2006.01)
*F04B 27/18* (2006.01)

(52) U.S. Cl.
CPC .......... *F16K 31/0675* (2013.01); *F04B 27/18* (2013.01); *G05D 16/2022* (2019.01)

(58) Field of Classification Search
None
See application file for complete search history.

(56) References Cited

U.S. PATENT DOCUMENTS 3,168,242 A * 2/1965 Diener ................... G05D 23/24
236/78 D
3,851,285 A * 11/1974 Rothfuss ............... H01F 7/1607
335/262

(Continued)

FOREIGN PATENT DOCUMENTS

CN 101743601 6/2010 ............. H01F 7/08
CN 108843646 11/2018 ............ F15B 13/02

(Continued)

OTHER PUBLICATIONS

European Search Report issued in corresponding applicatiton serial No. 20782227.1, dated Oct. 31, 2022, 14 pages.
Chinese Official Action issued inn corresponding application serial No. 202080026754.8, dated Nov. 17, 2022, 11 pages.

(Continued)

*Primary Examiner* — Matthew W Jellett
(74) *Attorney, Agent, or Firm* — HAYES SOLOWAY P.C.

(57) ABSTRACT

In a capacity control valve, a position of a valve element is changed by drawing a movable iron core to a fixed iron core with magnetic force by energization of an electromagnetic coil. The iron core on one side includes a projected portion on the radially outer side, the iron core on the other side includes a projected portion on the radially inner side, and these projected portions are capable of being loosely fitted to each other when the movable iron core is drawn to the fixed iron core. The projected portion is formed to be smaller than an opposing surface of the iron core facing an effective magnetic force surface of a distal end of the projected portion and formed in a tapered shape.

10 Claims, 10 Drawing Sheets

(56) References Cited

U.S. PATENT DOCUMENTS

| | | | | |
|---|---|---|---|---|
| 4,403,765 A | * | 9/1983 | Fisher | H01F 7/1646 335/266 |
| 4,604,600 A | * | 8/1986 | Clark | H01F 7/13 335/279 |
| 5,565,832 A | | 10/1996 | Haller et al. | H01F 7/12 |
| 5,771,933 A | | 6/1998 | Akamatsu et al. | F15B 31/044 |
| 6,206,343 B1 | * | 3/2001 | Kato | F16K 31/0613 335/301 |
| 6,498,416 B1 | * | 12/2002 | Oishi | F16K 31/0624 310/214 |
| 6,615,780 B1 | * | 9/2003 | Lin | F01L 1/34 123/90.11 |
| 8,973,894 B2 | * | 3/2015 | Ozaki | H01F 7/1607 335/262 |
| 2006/0000994 A1 | * | 1/2006 | Kondo | F16K 31/0613 251/129.15 |
| 2010/0213758 A1 | | 8/2010 | Nanahara | 303/20 |
| 2010/0252757 A1 | | 10/2010 | Birkelund et al. | F16K 31/06 |
| 2012/0001109 A1 | | 1/2012 | Nanahara et al. | F16K 31/02 |
| 2015/0233487 A1 | | 8/2015 | Matsumoto et al. | F16K 31/06 |

FOREIGN PATENT DOCUMENTS

| | | | |
|---|---|---|---|
| DE | 102014111980 | 8/2014 | H01F 7/16 |
| JP | H4-119271 | 4/1992 | F16K 31/06 |
| JP | 2892473 | 2/1999 | F16K 31/06 |
| JP | 2001-349278 | 12/2001 | F04B 27/14 |
| JP | 2001342946 | 12/2001 | F04B 27/14 |
| JP | 20022050456 | 9/2002 | F16K 31/06 |
| JP | 2008-291821 | 12/2008 | F04B 49/06 |
| WO | WO2018207461 | 11/2018 | F04B 27/18 |

OTHER PUBLICATIONS

International Search Report and Written Opinion issued in related PCT International Application Serial No. PCT/JP2020/015183, dated Jun. 23, 2020, 13 pages.

International Preliminary Report on Patentability issued in related PCT International Application Serial No. PCT/JP2020/015183, dated Oct. 14, 2021, 6 pages.

Chinese Official Action issued in corresponding application serial No. 202080026754.8, dated Jun. 13, 2023, 11 pages, wtih translation.

* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile in accordance with pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing suction pressure Ps of a suction chamber that suctions the fluid, discharge pressure Pd of a discharge chamber that discharges the fluid pressurized by the pistons, and control pressure Pc of the control chamber that houses the swash plate, with using a capacity control valve to be driven to open and close by electromagnetic force.

At the time of continuously driving the variable displacement compressor, there are a capacity control valve of a type of performing normal control in which energization is controlled by a control computer, a valve element is moved in the axial direction by electromagnetic force generated in a solenoid, and a DC valve provided between a discharge port through which a discharge fluid of the discharge pressure Pd passes and a control port through which a control fluid of the control pressure Pc passes is opened and closed to adjust the control pressure Pc of the control chamber of the variable displacement compressor, and another capacity control valve of a type of performing normal control in which a CS valve provided between a suction port through which a suction fluid of the suction pressure Ps passes and a control port through which a control fluid of the control pressure Pc passes is opened and closed to adjust the control pressure Pc of the control chamber of the variable displacement compressor.

At the time of normal control of the capacity control valve, the pressure of the control chamber in the variable displacement compressor is appropriately controlled, and by continuously changing the tilt angle of the swash plate with respect to the rotating shaft, the stroke amount of the pistons is changed to control the discharge amount of the fluid to the discharge chamber. Thus, the air conditioning system is adjusted to have a desired cooling ability. A valve opening degree of the valve element is changed in accordance with electromagnetic force by an electric current applied to the solenoid, and in response to this, a target value of a pressure difference is changed, so that the control pressure Pc is changed.

As in the description of the conventional art in Patent Citation 1, conventionally, opposing surfaces of two iron cores of a movable iron core and a fixed iron core are made to be flat surfaces orthogonal to the axial direction of these iron cores. In such a structure, when the iron cores are brought close to each other, that is, following a valve element moving from an initial position to a maximum stroke position, magnetic force applied to the opposing surfaces of the iron cores in the axial direction is rapidly increased. Thus, there is a problem that fine adjustment of opening and closing of the valve element is difficult.

Alternatively, an opposing surface of an iron core on one side is formed in a circular-conical shape, and an opposing surface on the other side is formed in a shape to be loosely fitted to this circular-conical opposing surface with a recess and a projection. In such a structure, following a valve element moving from an initial position to a maximum stroke position, magnetic force applied with a radial component is gradually applied between the opposing surfaces which oppose each other in parallel while tilting. Thus, a rapid increase in the magnetic force applied to the opposing surfaces of the iron cores is prevented, and fine adjustment of opening and closing of the valve element can be performed. However, there is a disadvantage that the magnetic force applied between the opposing surfaces is small and axial thrust force of moving the movable iron core in the axial direction by electromagnetic force is small. Thus, there is a problem that in order to sufficiently ensure the axial thrust force, a large and powerful solenoid is required.

Further, an embodiment of Patent Citation 1 proposes a capacity control valve in which a projected portion formed in a truncated circular-conical shape, in other words, in a trapezoidal shape in a sectional view, the projected portion having a large flat surface orthogonal to the axial direction of the iron core in a distal end is formed in the iron core on one side, and a recessed portion formed in a shape corresponding to this projected portion is formed in the iron core on the other side.

CITATION LIST

Patent Literature

Patent Citation 1: JP 2892473 B2 (PAGE 2, FIG. 2)

SUMMARY OF INVENTION

Technical Problem

In the capacity control valve disclosed as the embodiment of Patent Citation 1, with the structure described above, while increasing the magnetic force applied between the opposing surfaces by the flat surface orthogonal to the axial direction of the iron core and ensuring the axial thrust force of reliably holding the valve element at the maximum stroke position of the valve element, by preventing the rapid increase in the magnetic force applied to the opposing surfaces of the iron cores following the valve element moving from the initial position to the maximum stroke position, fine adjustment of opening and closing of the valve element can be performed. However, the opposing surface of the iron core on one side is formed in a truncated circular-conical shape, the opposing surface of the iron core on the other side is formed in a recessed shape complementary to the truncated circular-conical shape, and both the iron cores are formed in a shape to be loosely fitted to each other with a recess and a projection. Thus, there is a problem that size of the entire structure is increased in a case where the axial thrust force at the maximum stroke position of the valve element is to be enhanced. Meanwhile, there is another problem that with an arrangement configuration in which a separation distance of both the iron cores at the maximum stroke position of the valve element is small, the magnetic force applied between the tilted opposing surfaces is increased due to closeness in the axial direction, and fine adjustment of opening and closing of the valve element cannot be smoothly controlled.

The present invention is achieved focusing on such problems, and an object thereof is to provide a capacity control valve with which a valve element can be smoothly controlled and the valve element can be stably held at a maximum stroke position.

Solution to Problem

In order to solve the foregoing problems, a capacity control valve according to the present invention is a capacity control valve in which a position of a valve element is changed by drawing a movable iron core to a fixed iron core with magnetic force generated in accordance with energization of an electromagnetic coil, wherein one of the fixed iron core and the movable iron core includes a projected portion which is projected in an axial direction on a radially outer side, remaining one of the fixed iron core and the movable iron core includes a projected portion which is projected in the axial direction on a radially inner side, the projected portions are capable of being loosely fitted to each other when the movable iron core is drawn to the fixed iron core, and the projected portion of the one of the fixed iron core and the movable iron core is formed in a tapered shape so as to have, as a distal end surface thereof, an effective magnetic force surface which is smaller than an opposing surface of the remaining one of the fixed iron core and the movable iron core, the opposing surface facing the effective magnetic force surface. According to the aforesaid feature of the present invention, since the projected portion of the one of the fixed iron core and the movable iron core is formed in a tapered shape, magnetic force applied with a radial component between the projected portion of the remaining one of the fixed iron core and the movable iron core and the projected portion of the one of the fixed iron core and the movable iron core is small on the distal end side, and the magnetic force applied with the radial component between the projected portion of the remaining one of the fixed iron core and the movable iron core and the projected portion of the one of the fixed iron core and the movable iron core is large on the proximal end side. Thus, the magnetic force applied between the iron cores within a range from an initial position of the valve element to the vicinity of the maximum stroke is not easily influenced by closeness in the axial direction, and has a characteristic that axial thrust force is flat, and in and after the vicinity of the maximum stroke of the valve element, can have a characteristic that the effective magnetic force surface of the distal end of the projected portion is brought close to the opposing surface of the opposing iron core, the magnetic force applied in the axial direction is radically increased, and the axial thrust force is rapidly increased, that is, a characteristic to be radically increased in the vicinity of the maximum stroke while ensuring a large region where the axial thrust force is flat. Thereby, the axial thrust force is small within the range from the initial position to the vicinity of the maximum stroke. Thus, it is possible to smoothly control the valve element and stably hold the valve element with large axial thrust force at the maximum stroke position.

It may be preferable that the one of the fixed iron core and the movable iron core has a tilted surface forming the tapered shape of the projected portion thereof, and the tilted surface is not parallel to an outer peripheral surface of the projected portion of the remaining one of the fixed iron core and the movable iron core. According to this preferable configuration, the tilted surface of the projected portion of the one of the fixed iron core and the movable iron core and the outer peripheral surface of the projected portion of the remaining one of the fixed iron core and the movable iron core are not parallel to each other. Thus, it is possible to evidently distinguish the characteristic of the axial thrust force between the range from the initial position of the valve element to the vicinity of the maximum stroke and the side of the maximum stroke position of the valve element.

It may be preferable that the outer peripheral surface of the projected portion of the remaining one of the fixed iron core and the movable iron core is parallel to the axial direction. According to this preferable configuration, the peripheral surface is parallel to the axial direction of the iron core. Thus, it is possible to extremely decrease the magnetic force applied with the radial component between the projected portions. It is possible to effectively flatten an increase in the axial thrust force within the range from the initial position of the valve element to the vicinity of the maximum stroke.

It may be preferable that the effective magnetic force surface of the one of the fixed iron core and the movable iron core and the opposing surface of the remaining one of the fixed iron core and the movable iron core are formed to be orthogonal to the axial direction. According to this preferable configuration, the effective magnetic force surface and the opposing surface are formed to be orthogonal to the axial direction. Thus, it is possible to ensure large magnetic force applied in the axial direction when these surfaces are brought close to each other. Therefore, it is possible to rapidly increase the axial thrust force at the maximum stroke position of the valve element.

It may be preferable that the one of the fixed iron core and the movable iron core has a tilted surface forming the tapered shape of the projected portion thereof, and the tilted surface is formed so as to face an outer peripheral surface of the projected portion of the remaining one of the fixed iron core and the movable iron core. According to this preferable configuration, the tilted surface forming the tapered shape of the projected portion of the one of the fixed iron core and the movable iron core faces the outer peripheral surface of the projected portion of the remaining one of the fixed iron core and the movable iron core. Thereby, in and after the vicinity of the maximum stroke of the valve element, the proximal end side of the tilted surface of the projected portion of the one of the fixed iron core and the movable iron core and the outer peripheral surface of the projected portion of the remaining one of the fixed iron core and the movable iron core are brought close to each other, and the magnetic force applied with the radial component is increased between these projected portions. Thus, it is possible to stably hold the valve element at the maximum stroke position.

It may be preferable that the one of the fixed iron core and the movable iron core has a tilted surface forming the tapered shape of the projected portion thereof, and the tilted surface is formed on an outer peripheral side so as not to face an outer peripheral surface of the projected portion of the remaining one of the fixed iron core and the movable iron core. According to this preferable configuration, the tilted surface forming the tapered shape of the projected portion of the one of the fixed iron core and the movable iron core does not face the outer peripheral surface of the projected portion of the remaining one of the fixed iron core and the movable iron core. Thereby, a radial separation distance between these projected portions is not lessened at the time of moving the valve element. Thus, it is possible to extremely decrease an influence of the magnetic force applied with the radial component between these projected portions, and it is possible to effectively flatten the increase in the axial thrust force within the range from the initial position of the valve element to the vicinity of the maximum stroke.

It may be preferable that the capacity control valve is of a normal open type to be brought into an opened state upon non-energization of the electromagnetic coil. According to this preferable configuration, in a closed state at the time of energization, even when pressure is applied from a fluid to the valve element, the axial thrust force is strong at the maximum stroke position of the valve element which is a closed state. Thus, it is possible to reliably maintain a closed state.

It may be preferable that a capacity control valve in which a position of a valve element is changed by drawing a movable iron core to a fixed iron core with magnetic force generated in accordance with energization of an electromagnetic coil, wherein one of the fixed iron core and the movable iron core includes a projected portion which is projected in an axial direction on a radially outer side, and a recessed portion which is recessed in the axial direction on a radially inner side, remaining one of the fixed iron core and the movable iron core includes a projected portion which is projected in the axial direction on the radially inner side, and a recessed portion which is recessed in the axial direction on the radially outer side, the projected portions and the recessed portions are capable of being loosely fitted to each other when the movable iron core is drawn to the fixed iron core, a gap between a distal end of the projected portion of the one of the fixed iron core and the movable iron core and a bottom end of the recessed portion of the remaining one of the fixed iron core and the movable iron core is different from a gap between a distal end of the projected portion of the remaining one of the fixed iron core and the movable iron core and a bottom end of the recessed portion of the one of the fixed iron core and the movable iron core when the movable iron core is drawn to the fixed iron core, and the distal end of the projected portion of the one of the fixed iron core and the movable iron core and the bottom end of the recessed portion of the remaining one of the fixed iron core and the movable iron core are placed within an effective magnetic force range as well as the distal end of the projected portion of the remaining one of the fixed iron core and the movable iron core and the bottom end of the recessed portion of the one of the fixed iron core and the movable iron core are placed out of the effective magnetic force range when the movable iron core is not drawn to the fixed iron core. According to this preferable configuration, the distal end of the projected portion of the one of the fixed iron core and the movable iron core and the bottom surface of the recessed portion which are placed within the effective magnetic force range move the valve element with working force when the movable iron core is not drawn to the fixed iron core. At this time, regarding the distal end of the projected portion of the remaining one of the fixed iron core and the movable iron core and the bottom surface of the recessed portion which are placed out of the effective magnetic force range, working force is not actualized at an initial stage, and following working of one side, the other side comes into the effective magnetic force range, and then the working force is actualized. Therefore, the magnetic force applied between the iron cores within the range from the initial position of the valve element to the vicinity of the maximum stroke has a characteristic that the axial thrust force is flat, and also can have a characteristic that the magnetic force applied in the axial direction is radically increased and the axial thrust force is rapidly increased, that is, a characteristic to be radically increased in the vicinity of the maximum stroke while ensuring a large region where the axial thrust force is flat. Thereby, the axial thrust force is small within the range from the initial position to the vicinity of the maximum stroke. Thus, it is possible to smoothly control the valve element and stably hold the valve element with large axial thrust force at the maximum stroke position.

BRIEF DESCRIPTION OF DRAWINGS

FIG. 7 is a sectional view in which a major part is enlarged, showing an opposing shape of the movable iron core and the center post in the first embodiment.

DESCRIPTION OF EMBODIMENTS

Modes for carrying out a capacity control valve according to the present invention will be described below based on embodiments.

First Embodiment

A capacity control valve according to a first embodiment of the present invention will be described with reference to FIGS. 1 to 7. Hereinafter, description will be given with the left and right sides seen from the front side of FIG. 2 being the left and right sides of the capacity control valve.

A capacity control valve V of the present invention is assembled into a variable displacement compressor M used for an air conditioning system of an automobile, etc. By variably controlling pressure of a working fluid (hereinafter, simply referred to as the "fluid") serving as a coolant, a discharge amount of the variable displacement compressor M is controlled and the air conditioning system is adjusted to have a desired cooling ability.

Figure 1:
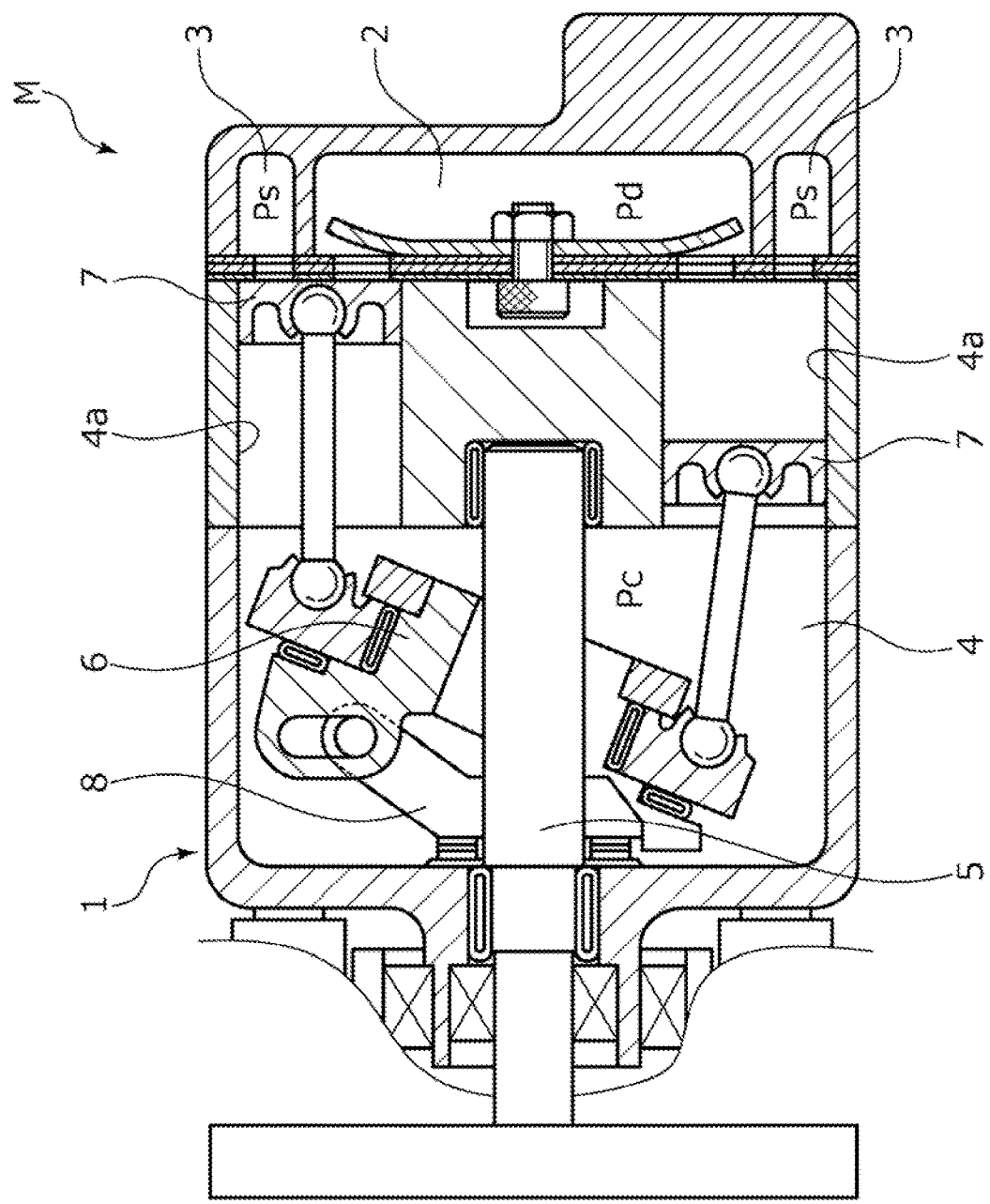
FIG. 1 is a schematic configuration diagram showing a swash plate type variable displacement compressor into which a capacity control valve according to embodiments of the present invention is assembled.

First, the variable displacement compressor M will be described. As shown in FIG. 1, the variable displacement compressor M has a casing 1 including a discharge chamber 2, a suction chamber 3, a control chamber 4, and plural cylinders 4a. A communication passage (not shown) providing direct communication between the control chamber 4 and the suction chamber 3 is provided in the variable displacement compressor M. A fixed orifice for adjusting and balancing pressure between the suction chamber 3 and the control chamber 4 is provided in this communication passage.

The variable displacement compressor M also includes a rotating shaft 5 to be driven and rotated by an engine (not shown) installed outside the casing 1, a swash plate 6 coupled to the rotating shaft 5 in an eccentric state by a hinge mechanism 8 in the control chamber 4, and plural pistons 7 coupled to the swash plate 6 and fitted reciprocatably in the respective cylinders 4a. With using the capacity control valve V to be driven to open and close by electromagnetic force, a tilt angle of the swash plate 6 is continuously changed by appropriately controlling pressure in the control chamber 4 while utilizing suction pressure Ps of the suction chamber 3 that suctions the fluid, discharge pressure Pd of the discharge chamber 2 that discharges the fluid pressurized by the pistons 7, and control pressure Pc of the control chamber 4 that houses the swash plate 6. Thereby, a stroke amount of the pistons 7 is changed to control a discharge amount of the fluid. For convenience of description, the capacity control valve V assembled into the variable displacement compressor M is not shown in FIG. 1.

Specifically, the higher the control pressure Pc in the control chamber 4 is, the smaller the tilt angle of the swash plate 6 with respect to the rotating shaft 5 becomes, and the more the stroke amount of the pistons 7 is reduced. However, when the pressure becomes fixed pressure or more, the swash plate 6 is brought into a substantially perpendicular state with respect to the rotating shaft 5, that is, a state where the swash plate 6 is slightly tilted from the exactly perpendicular state. At this time, the stroke amount of the pistons 7 becomes minimum, and pressurization of the fluid in the cylinders 4a by the pistons 7 becomes minimum. Therefore, the discharge amount of the fluid to the discharge chamber 2 is reduced, and the cooling ability of the air conditioning system becomes minimum. Meanwhile, the lower the control pressure Pc in the control chamber 4 is, the larger the tilt angle of the swash plate 6 with respect to the rotating shaft 5 becomes, and the more the stroke amount of the pistons 7 is increased. However, when the pressure becomes fixed pressure or less, the tilt angle of the swash plate 6 with respect to the rotating shaft 5 becomes maximum. At this time, the stroke amount of the pistons 7 becomes maximum, and the pressurization of the fluid in the cylinders 4a by the pistons 7 becomes maximum. Therefore, the discharge amount of the fluid to the discharge chamber 2 is increased, and the cooling ability of the air conditioning system becomes maximum.

Figure 2:
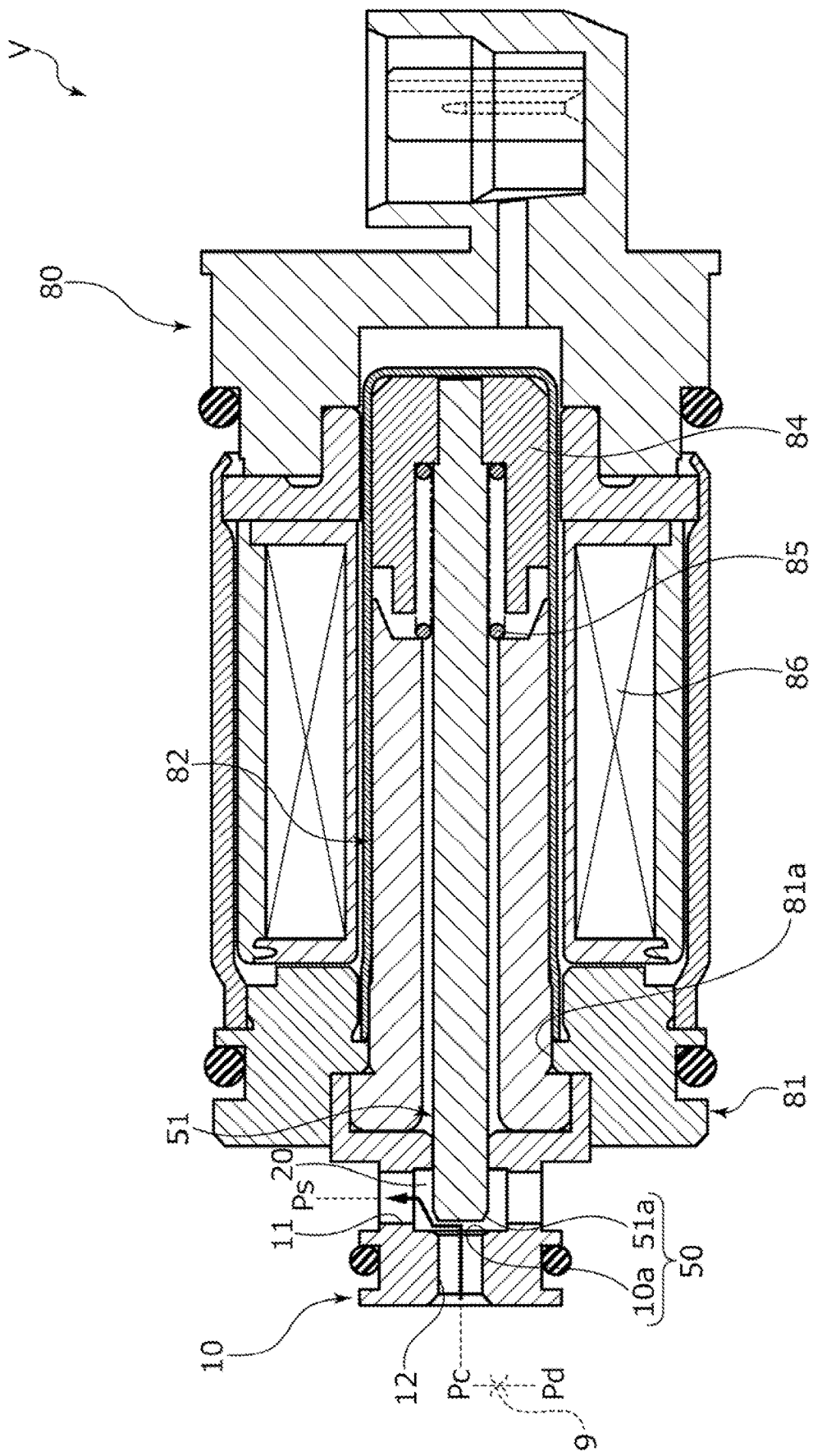
FIG. 2 is a sectional view showing a state where a CS valve is opened in a non-energized state of the capacity control valve according to the first embodiment of the present invention.
Figure 3:
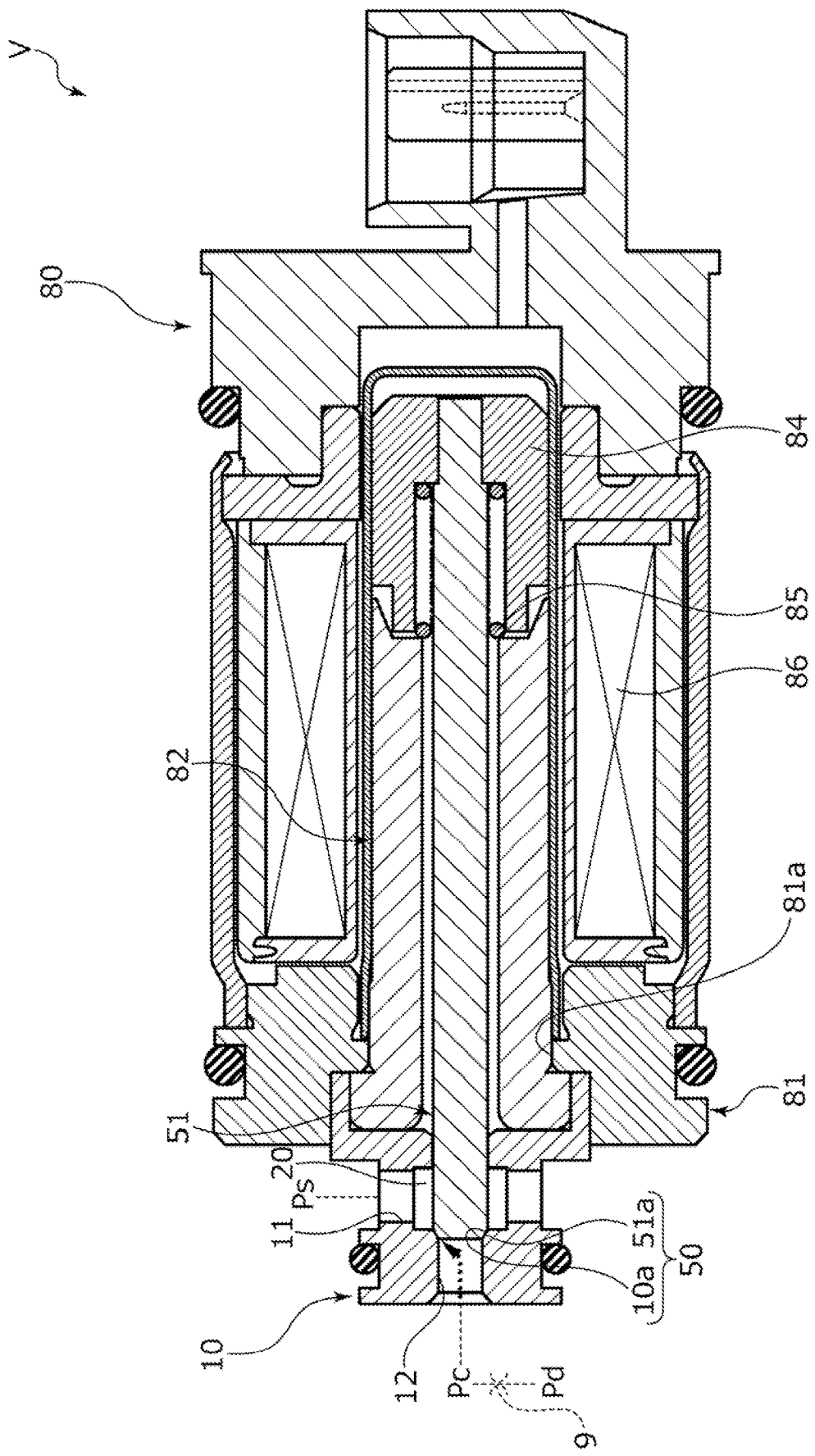
FIG. 3 is a sectional view showing a state where the CS valve is closed in an energized state (e.g., at the time of normal control) of the capacity control valve according to the first embodiment of the present invention.

As shown in FIGS. 2 and 3, the capacity control valve V assembled into the variable displacement compressor M adjusts an electric current energized in an electromagnetic coil 86 forming a solenoid 80 and performs open/close control of a CS valve 50 in the capacity control valve V, so that by controlling the fluid flowing out to the suction chamber 3 from the control chamber 4, the control pressure Pc in the control chamber 4 is variably controlled. A communication passage providing direct communication between the discharge chamber 2 and the control chamber 4 is provided in the variable displacement compressor M. A fixed orifice 9 for adjusting and balancing pressure between the discharge chamber 2 and the control chamber 4 is provided in this communication passage. That is, a discharge fluid of the discharge pressure Pd of the discharge chamber 2 is always supplied to the control chamber 4 via the fixed orifice 9, and the control pressure Pc in the control chamber 4 is increased by closing the CS valve 50 in the capacity control valve V.

In the present embodiment, the CS valve 50 is formed by a CS valve element 51 serving as a valve element and a CS valve seat 10a formed on an inner peripheral surface of a valve housing 10. By connecting and separating an axially left end 51a of the CS valve element 51 to and from the CS valve seat 10a, the CS valve 50 is opened and closed.

Next, a structure of the capacity control valve V will be described. As shown in FIGS. 2 and 3, the capacity control valve V is mainly formed by the valve housing 10 made of a metal material or a resin material, the CS valve element 51 whose axially left end portion is arranged in the valve housing 10, and the solenoid 80 connected to the valve housing 10, the solenoid that applies drive force to the CS valve element 51.

As shown in FIGS. 2 and 3, the CS valve element 51 is a pillar-shaped body having a constant section, and also serves as a rod arranged to pass through the electromagnetic coil 86 of the solenoid 80.

As shown in FIGS. 2 and 3, in the valve housing 10, a Ps port 11 serving as a suction port which communicates with the suction chamber 3 of the variable displacement compressor M and a Pc port 12 serving as a control port which communicates with the control chamber 4 of the variable displacement compressor M are formed.

Inside the valve housing 10, a valve chamber 20 is formed. In the valve chamber 20, the axially left end portion of the CS valve element 51 is arranged reciprocatably in the axial direction. The Ps port 11 extends in the radially inward direction from an outer peripheral surface of the valve housing 10, and communicates with the valve chamber 20. The Pc port 12 extends to the axially right side from the radially inner side of an axially left end of the valve housing 10 and communicates with the valve chamber 20.

On the inner peripheral surface of the valve housing 10, the CS valve seat 10a is formed at an opening end edge of the Pc port 12 on the valve chamber 20 side. On the inner peripheral surface of the valve housing 10, a guide hole 10b with which an outer peripheral surface of the CS valve element 51 is slidable in a substantially sealed state is formed on the solenoid 80 side of the CS valve seat 10a and the valve chamber 20.

The valve housing 10 includes a recessed portion 10c in which the radially inner side of an axially right end is recessed to the axially left side, and is integrally connected and fixed in a substantially sealed state by inserting a flange portion 82d of a center post 82 serving as a fixed iron core which forms the solenoid 80 from the axially right side. On the radially inner side of a bottom surface of the recessed portion 10c of the valve housing 10, an opening end of the guide hole 10b on the solenoid 80 side is formed.

As shown in FIGS. 2 and 3, the solenoid 80 is mainly formed by a casing 81 having an opening portion 81a which is open on the axially left side, the substantially cylindrical center post 82 inserted into the opening portion 81a of the casing 81 from the axially left side and fixed on the radially inner side of the casing 81, the CS valve element 51 inserted into the center post 82 reciprocatably in the axial direction, the CS valve element whose axially left end portion is arranged in the valve housing 10, a movable iron core 84 to which an axially right end portion of the CS valve element 51 is inserted and fixed, a coil spring 85 provided between the center post 82 and the movable iron core 84, the coil spring serving as a spring that biases the movable iron core 84 to the axially right side which is the valve opening direction of the CS valve 50, and the excitation electromagnetic coil 86 wound on the outside of the center post 82 via a bobbin.

Next, a structure of the center post 82 and the movable iron core 84 will be described with using FIG. 4. The center post 82 includes a projected portion 90 formed to project to the side opposing the movable iron core 84, the projected portion annularly continuing when seen from an opposing surface. The projected portion 90 is formed on the radially outer side, and formed in a tapered shape including a distal end surface 90a extending in the direction orthogonal to the axial direction, and an inner peripheral surface 90b continuous to the distal end surface 90a, the inner peripheral surface being tilted with respect to the axial direction of the center post 82. On the radially inner side of a base part of the projected portion 90, an opposing surface 91 serving as a bottom surface of a recessed portion orthogonal to the axial direction of the center post 82 is formed.

The movable iron core 84 includes a projected portion 92 formed to project to the side opposing the center post 82, the projected portion annularly continuing when seen from an opposing surface. The projected portion 92 is formed on the radially inner side, and formed in a shape of equal width including a distal end surface 92a extending in the direction orthogonal to the axial direction, and an outer peripheral surface 92b continuous to the distal end surface 92a, the outer peripheral surface forming a surface which is parallel to the axial direction of the movable iron core 84. On the radially outer side of a base part of the projected portion 92, an opposing surface 93 serving as a bottom surface of a recessed portion orthogonal to the axial direction of the movable iron core 84 is formed. The distal end surface 90a and the opposing surface 91 of the center post 82 and the opposing surface 93 and the distal end surface 92a of the movable iron core 84 are parallel to each other.

An outer diameter of the center post 82 may be formed preferably within a range from $\varphi 7.4$ to $\varphi 9.4$, further preferably within a range from $\varphi 7.9$ to $\varphi 8.9$. An inner diameter of the center post 82 may be formed preferably within a range from $\varphi 2.0$ to $\varphi 4.0$, further preferably within a range from $\varphi 2.5$ to $\varphi 3.5$. A tilt angle $\alpha$ of the inner peripheral surface 90b with respect to the axial direction of the center post 82 may be formed preferably within a range from 5 degrees to 15 degrees, further preferably within a range from 8 degrees to 12 degrees. According to this, while preventing that axial thrust force is decreased, it is possible to ensure a large range of a thrust force flat section to be described later.

Further, an outer diameter of the movable iron core 84 may be formed preferably within a range from $\varphi 7.5$ to $\varphi 9.5$, further preferably within a range from $\varphi 8.0$ to $\varphi 9.0$. An inner diameter of the movable iron core 84 may be formed preferably within a range from $\varphi 3.3$ to $\varphi 5.3$, further preferably within a range from $\varphi 3.8$ to $\varphi 4.8$. Radial size L2 of the distal end surface 92a of the projected portion 92 of the movable iron core 84 may be formed preferably to be not less than 1.0 mm. According to this, it is possible to prevent that the axial thrust force is decreased. Further, radial size L1 of a minimum gap between the outer peripheral surface 92b of the projected portion 92 of the movable iron core 84 and the inner peripheral surface 90b of the projected portion 90 of the center post 82 may be formed preferably within a range from 0.1 mm to 0.3 mm, further preferably within a range from 0.15 mm to 0.25 mm. According to this, while preventing that the axial thrust force is decreased, it is possible to suppress the thrust force from lowering in a state where the CS valve element 51 immediately after energization is placed at an initial position.

Next, actions of the capacity control valve V, mainly actions of opening and closing the CS valve 50 will be described.

First, a non-energized state of the capacity control valve V will be described. As shown in FIG. 2, in the capacity control valve V, in a non-energized state, by pressing the movable iron core 84 to the axially right side by bias force of the coil spring 85 forming the solenoid 80, the CS valve element 51 is moved to the axially right side and the axially left end 51a of the CS valve element 51 is separated from the CS valve seat 10a formed on the inner peripheral surface of the valve housing 10, and the CS valve 50 is opened. FIG. 2 shows a state where the CS valve element 51 is placed at the initial position.

As shown in FIG. 3, in the capacity control valve V, in an energized state, that is, at the time of normal control, at the time of so-called duty control, by application of an electric current to the solenoid 80, by pulling the movable iron core 84 to the center post 82 side, that is, the axially left side, and moving the CS valve element 51 fixed to the movable iron core 84 to the axially left side together, the axially left end 51a of the CS valve element 51 is seated on the CS valve seat 10a of the valve housing 10, and the CS valve 50 is closed. FIG. 3 shows a state where the CS valve element 51 is moved to a maximum stroke position and the CS valve 50 is closed.

Figure 4:
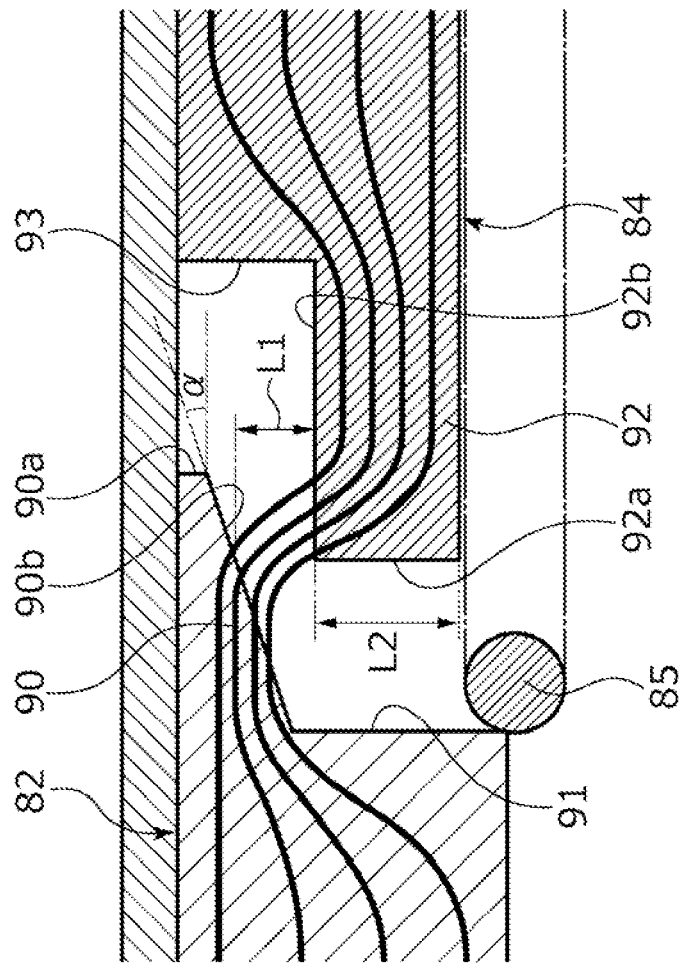
FIG. 4 is a sectional view in which a major part is enlarged, showing an opposing shape of a movable iron core and a center post in the first embodiment, and showing a state where a CS valve element immediately after energization is placed at an initial position.
Figure 5:
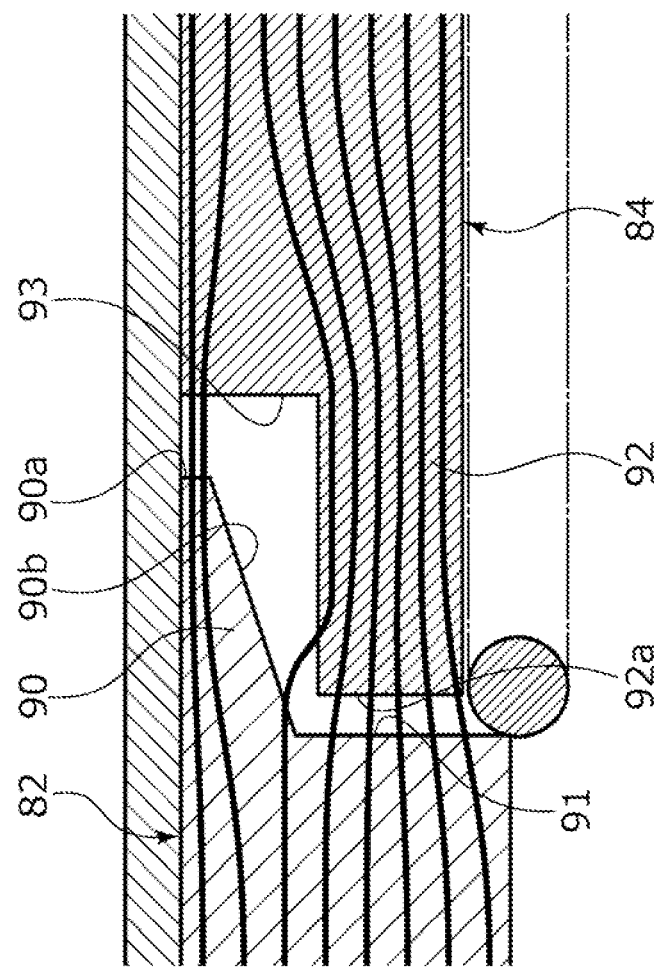
FIG. 5 is a sectional view in which a major part is enlarged, similarly showing a state where the CS valve element is placed at a valve closing position at the time of energization in the first embodiment.

FIG. 4 shows a state immediately after energization where the CS valve element 51 is placed at the initial position, and FIG. 5 shows a state where energization is made by the maximum current value and the CS valve element 51 is moved to a valve closing position. As shown in FIG. 4, the projected portion 90 of the center post 82 is formed in a tapered shape. Thus, the distal end side of the projected portion 90 is separated from the projected portion 92 of the movable iron core 84 in the radial direction, and an influence of magnetic force applied with a radial component between these projected portions is highly small. In such a way, in a state where the movable iron core 84 is absorbed and moved toward the center post 82 by energization, the projected portion 90 of the center post 82 and the projected portion 92 of the movable iron core 84 can be loosely fitted. FIGS. 4 and 5 conceptually display a state of magnetic lines at the initial position and the valve closing position of the CS valve element 51.

The inner peripheral surface 90b forming the tapered shape of the projected portion 90 of the center post 82 and the outer peripheral surface 92b of the projected portion 92 of the movable iron core 84 parallel to the axial direction have different angles from each other. Thus, within a range from the initial position of the CS valve element 51 before the valve closing position, an increase in the magnetic force applied with the radial component between these projected portions is small.

In addition, as an effect of the tapered shape of the projected portion 90 of the center post 82, in addition to a relationship of a separation distance between the projected portion 90 and the projected portion 92 described above, since a sectional area of the center post 82 is larger on the base side than the distal end side, the magnetic force applied with the radial component is small on the distal end side between the projected portion 92 of the movable iron core 84 and the projected portion 90.

Since the outer peripheral surface 92b of the projected portion 92 of the movable iron core 84 forms a surface which is parallel to the axial direction of the movable iron core 84. Thus, it is possible to extremely decrease the magnetic force applied with the radial component between the projected portion 90 of the center post 82 and the projected portion 92. It is possible to effectively flatten the increase in the axial thrust force within the large range from the initial position of the CS valve element 51 before the valve closing position (see FIG. 6). For reference, when the outer peripheral surface 92b is formed to be tilted in parallel to the tilted inner peripheral surface 90b, there is a lot of magnetic flux passing through the outer peripheral surface 92b and the inner peripheral surface 90b following movement of the movable iron core 84 in the valve closing direction, a region where the axial thrust force is flat is narrowed more than a mode of the first embodiment, and the axial thrust force is gently increased as a characteristic.

When the CS valve element 51 is moved to the valve closing position, the distal end surface 90a serving as an effective magnetic force surface of a distal end of the projected portion 90 of the center post 82 and the opposing surface 93 of the movable iron core 84, and the opposing surface 91 of the center post 82 and the distal end surface 92a of the projected portion 92 of the movable iron core 84 are respectively brought close to each other. Thus, the magnetic force applied in the axial direction of the center post 82 and the movable iron core 84 is radically increased. In other words, before the CS valve element 51 is moved to the valve closing position, that is, within the range from the initial position of the CS valve element 51 before the valve closing position, the magnetic force applied in the axial direction of the center post 82 and the movable iron core 84 is not radically increased.

The distal end surface 90a serving as the effective magnetic force surface of the distal end of the projected portion 90 of the center post 82 and the opposing surface 93 of the movable iron core 84, and the opposing surface 91 of the center post 82 and the distal end surface 92a serving as an effective magnetic force surface of a distal end of the projected portion 92 of the movable iron core 84 are respectively formed to be orthogonal to the axial direction of the center post 82 and the movable iron core 84. Thus, it is possible to ensure large magnetic force applied in the axial direction at the time of bringing these surfaces close to each other, and it is possible to effectively rapidly increase the axial thrust force of the movable iron core 84 at the valve closing position of the CS valve 50.

An opposing area of the opposing surface 93 of the movable iron core 84 is larger than the distal end surface 90a serving as the effective magnetic force surface of the distal end of the projected portion 90 of the center post 82, and an opposing area of the opposing surface 91 of the center post 82 is larger than the distal end surface 92a serving as the effective magnetic force surface of the distal end of the projected portion 92 of the movable iron core 84. The magnetic flux more easily passes through, and it is possible to ensure suction force by large magnetic force between these opposing surfaces. This is not to prevent a mode that the distal end of the projected portion 92 of the movable iron core 84 extends to the inner side of the inner diameter of the center post 82, and the opposing area of the opposing surface 91 of the center post 82 is smaller than the distal end surface 92a serving as the effective magnetic force surface of the distal end of the projected portion 92 of the movable iron core 84.

Figure 6:
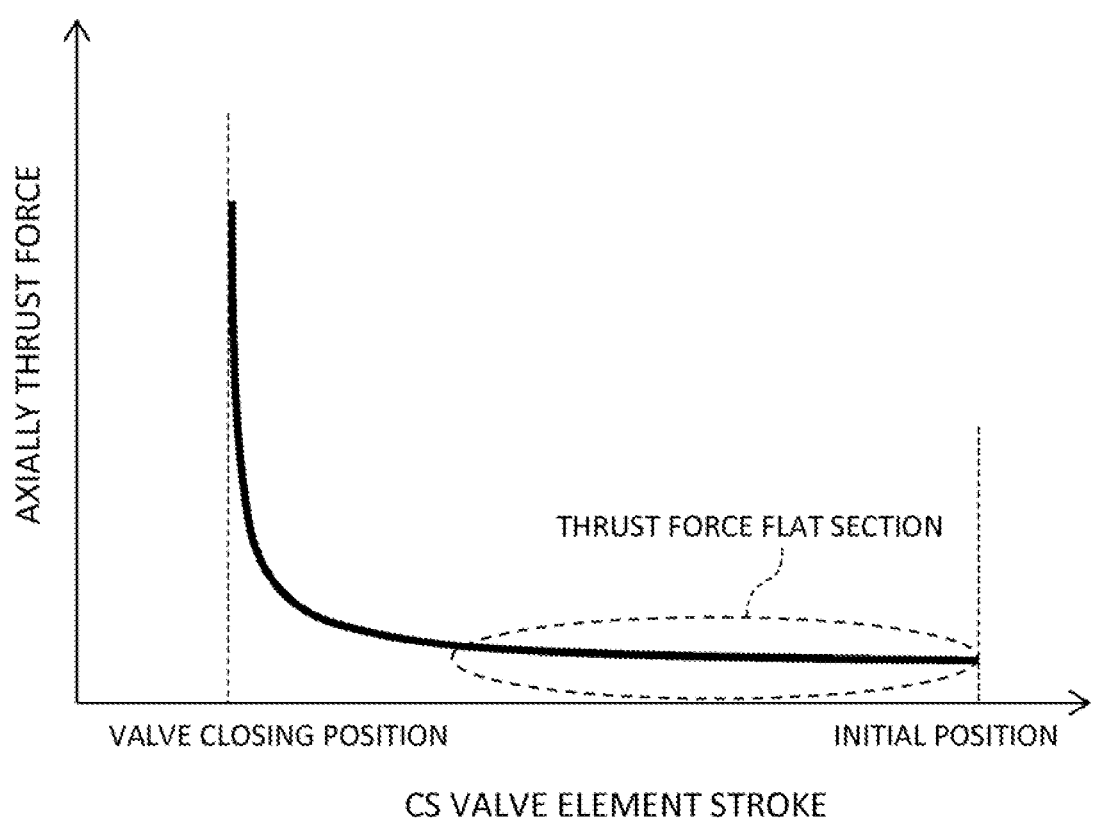
FIG. 6 is a graph showing a relationship between strokes of the CS valve element and axial thrust force of the movable iron core in the first embodiment.

By adopting the above configuration, as clear from a graph of FIG. 6 showing a relationship between strokes of the CS valve element 51 and the axial thrust force of the movable iron core 84, the characteristic is to form a shape close to a hyperbola with asymptotic lines being the x axis and the y axis, respectively. The thrust force flat section where a state of the axial thrust force which is small within the range from the initial position of the CS valve element 51 before the valve closing position is transitioned to be flat is shown. It is possible to smoothly control the CS valve element 51 and stably hold the CS valve element 51 with large axial thrust force at the valve closing position of the CS valve element 51. That is, it is possible to reliably maintain a closed state of the CS valve 50 where the control pressure Pc is applied.

The inner peripheral surface 90b forming the tapered shape of the projected portion 90 of the center post 82 is placed on the side opposing the outer peripheral surface 92b of the projected portion 92 of the movable iron core 84. As in FIG. 3, in a process of moving the CS valve element 51 to the valve closing position, the projected portion 92 of the movable iron core 84 is brought close in the radial direction on the base side of the projected portion 90 of the center post 82. Thus, the magnetic force applied with the radial component between these projected portions is gently increased due to closeness in the axial direction. That is, in and after the vicinity of the valve closing position, the magnetic force applied with the radial component supplements the axial thrust force.

The capacity control valve V in the above embodiment is of a normal open type to be brought into an opened state at the time of non-energization of the electromagnetic coil 86. As described above, in a closed state at the time of energization, even when pressure is applied from the fluid to the CS valve element 51, the axial thrust force is strong at the valve closing position of the CS valve element 51 which is a closed state. Thus, it is possible to reliably maintain a closed state. Therefore, the configuration of the present invention is useful for such a normal open type. In addition, the capacity control valve V of the first embodiment is also useful in a case of a closed state, since the capacity control valve V is of a type in which pressure applied to the Pc port 12 is enhanced over time due to an influence of the discharge pressure Pd.

Figure 7A:
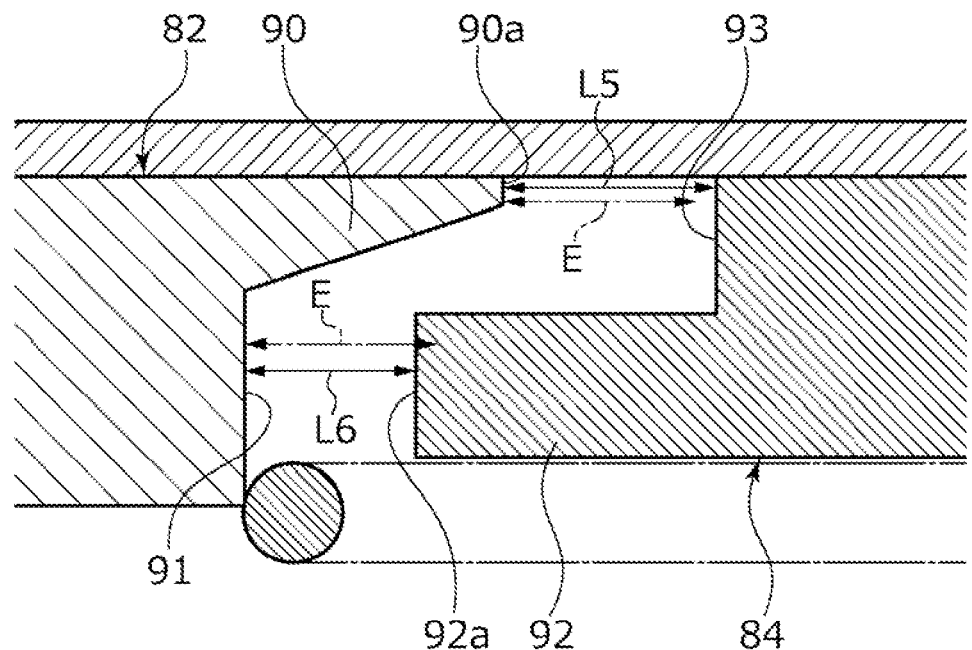
FIG. 7A shows a state where the CS valve element immediately after energization is placed at the initial position.
Figure 7B:
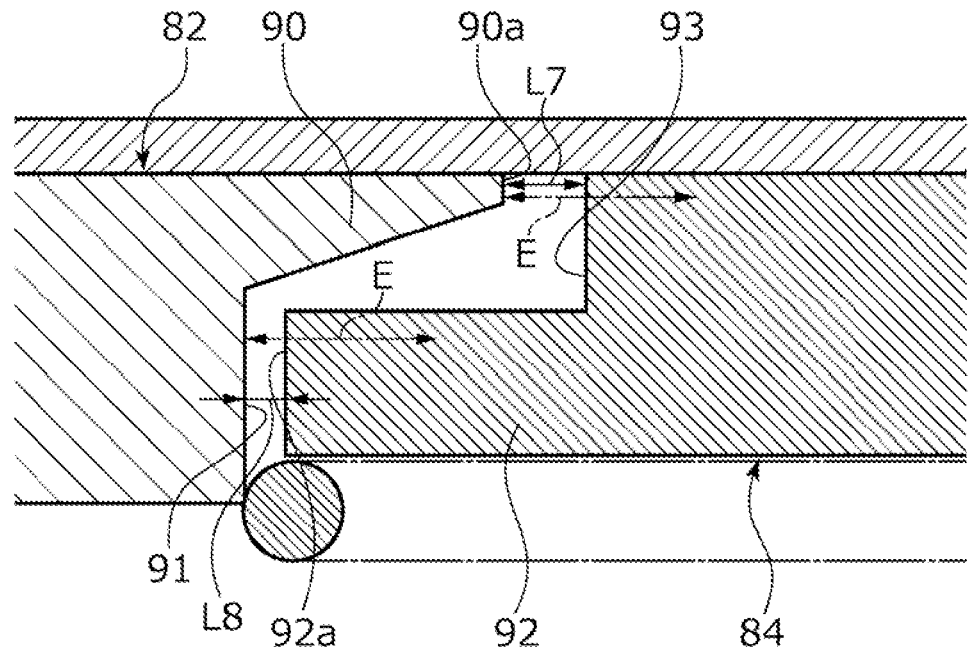
FIG. 7B shows a state where the CS valve element is placed at the valve closing position at the time of energization.

As shown in FIG. 7B, at the time of suctioning, that is, in a state where the CS valve element 51 is placed at the valve closing position, a gap L8 between the distal end surface 92a of the projected portion 92 of the movable iron core 84 and the opposing surface 91 of the center post 82 is different from a gap L7 between the distal end surface 90a of the projected portion 90 of the center post 82 and the opposing surface 93 of the movable iron core 84.

As shown in FIG. 7A, at the time of non-suctioning, that is, in a state where the CS valve element 51 is placed at the initial position, the distal end surface 92a of the projected portion 92 of the movable iron core 84 and the opposing surface 91 of the center post 82 are placed within an effective magnetic force range E. That is, a gap L6 between the distal end surface 92a of the projected portion 92 of the movable iron core 84 and the opposing surface 91 of the center post 82 is shorter than the effective magnetic force range E.

Further, at the time of non-suctioning, the distal end surface 90a of the projected portion 90 of the center post 82 and the opposing surface 93 of the movable iron core 84 are placed out of the effective magnetic force range E. That is, a gap L5 between the distal end surface 90a of the projected portion 90 of the center post 82 and the opposing surface 93 of the movable iron core 84 is formed to be longer than the effective magnetic force range E.

According to this, the distal end surface 92a of the projected portion 92 of the movable iron core 84 and the opposing surface 91 of the center post 82 which are placed within the effective magnetic force range E at the time of non-suctioning move the CS valve element 51 as working force. At this time, regarding the distal end surface 90a of the projected portion 90 of the center post 82 and the opposing surface 93 of the movable iron core 84 which are placed out of the effective magnetic force range E, working force is not actualized at an initial stage, and following working of the distal end surface 92a of the projected portion 92 of the movable iron core 84 and the opposing surface 91 of the center post 82, the distal end surface 90a of the projected portion 90 of the center post 82 and the opposing surface 93 of the movable iron core 84 come into the effective magnetic force range E, and then the working force is actualized. Therefore, the magnetic force applied between the center post 82 and the movable iron core 84 within the range from the initial position of the CS valve element 51 to the vicinity of the maximum stroke has a characteristic that the axial thrust force is flat, and also can have a characteristic that the magnetic force applied in the axial direction is radically increased and the axial thrust force is rapidly increased, that is, a characteristic to be radically increased in the vicinity of the maximum stroke while ensuring a large region where the axial thrust force is flat. Thereby, the axial thrust force is small within the range from the initial position to the vicinity of the maximum stroke. Thus, it is possible to smoothly control the CS valve element 51 and stably hold the CS valve element 51 with large axial thrust force at the maximum stroke position. In the present embodiment, the effective magnetic force range E indicates an axial distance where magnetic suction force of a predetermined value or more is generated.

Second Embodiment

A capacity control valve according to a second embodiment will be described with reference to FIGS. 8 and 9. Duplicated description for the same configurations as the first embodiment is omitted.

Figure 8:
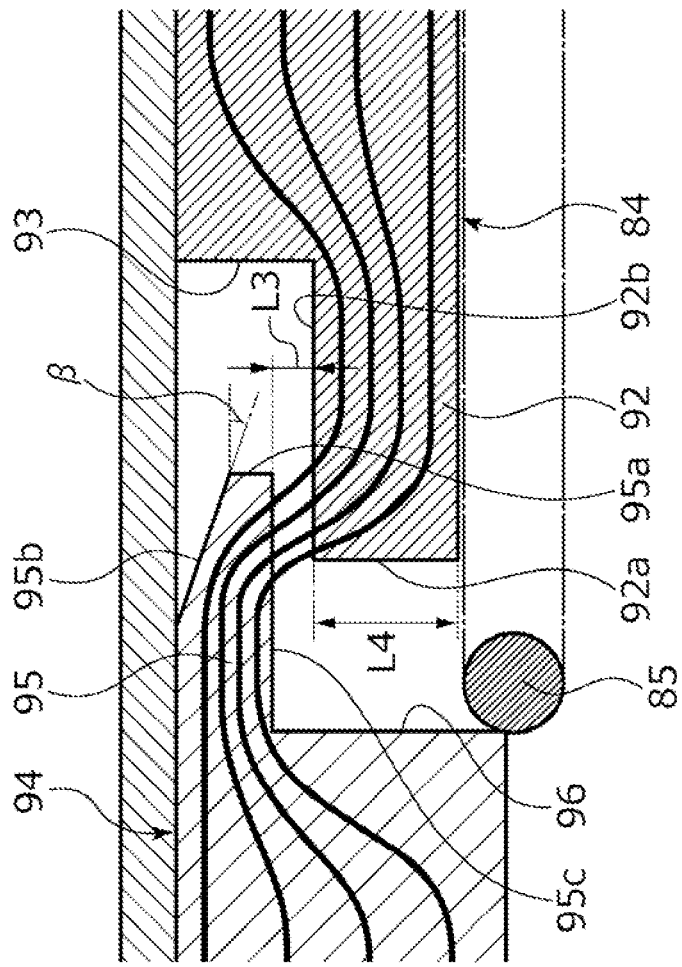
FIG. 8 is a sectional view in which a major part is enlarged, showing an opposing shape of a movable iron core and a center post of a capacity control valve according to a second embodiment of the present invention, and showing a state where a CS valve element immediately after energization is placed at an initial position.

As shown in FIG. 8, a center post 94 includes a projected portion 95 formed to project to the side opposing a movable iron core 84. The projected portion 95 is formed on the radially outer side, and formed in a tapered shape including an outer peripheral surface 95b tilted with respect to the axial direction of the center post 94 to a distal end surface 95a. An inner peripheral surface 95c of the projected portion 95 forms a surface which is parallel to the axial direction of the center post 94. On the radially inner side of a base part of the projected portion 95, an opposing surface 96 serving as a bottom surface of a recessed portion orthogonal to the axial direction of the center post 94 is formed.

A tilt angle β of the outer peripheral surface 95b with respect to the axial direction of the center post 94 may be formed preferably within a range from 15 degrees to 25 degrees, further preferably within a range from 18 degrees to 22 degrees. According to this, while preventing that axial thrust force is decreased, it is possible to ensure a large range of a thrust force flat section.

Figure 9:
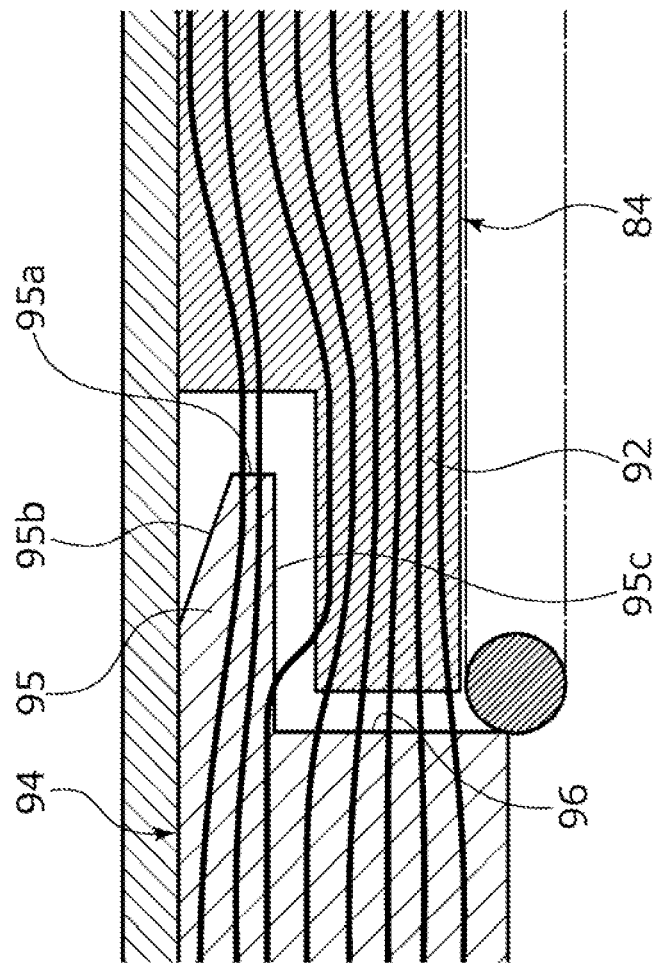
FIG. 9 is a sectional view in which a major part is enlarged, similarly showing a state where the CS valve element is placed at a valve closing position at the time of energization in the second embodiment.

As shown in FIGS. 8 and 9, the projected portion 95 of the center post 94 is formed in a tapered shape. Thus, a sectional area is larger on the base side than the distal end side, and magnetic force applied with a radial component between a projected portion 92 of the movable iron core 84 and the projected portion 95 is small on the distal end side and large on the base side. Therefore, within a range from an initial position of a CS valve element 51 before a valve closing position, the magnetic force applied between the center post 94 and the movable iron core 84 is transitioned while being small, and the axial thrust force is not rapidly increased but becomes flat.

When the CS valve element 51 is moved to the valve closing position side, the distal end surface 95a serving as an effective magnetic force surface of a distal end of the projected portion 95 of the center post 94 and an opposing surface 93 of the movable iron core 84, and the opposing surface 96 of the center post 94 and a distal end surface 92a of the projected portion 92 of the movable iron core 84 are respectively brought close to each other. Thus, the magnetic force applied in the axial direction of the center post 94 and the movable iron core 84 is radically increased.

The outer peripheral surface 95b forming the tapered shape of the projected portion 95 of the center post 94 is placed on the side not opposing the outer peripheral surface 92b of the projected portion 92 of the movable iron core 84, and the inner peripheral surface 95c of the projected portion 95 of the center post 94 forms the surface which is parallel to the axial direction of the center post 94. According to this, at the time of moving the CS valve element 51, the inner peripheral surface 95c of the projected portion 95 of the center post 94 and the outer peripheral surface 92b of the projected portion 92 of the movable iron core 84 which are parallel to each other are not brought close to each other in the radial direction, and it is possible to extremely decrease an influence of the magnetic force applied with the radial component between these projected portions. Thus, it is possible to effectively flatten the increase in the axial thrust force within the range from the initial position of the CS valve element 51 before the valve closing position.

When the CS valve element 51 is moved to the valve closing position as in FIG. 9, the sectional area is gradually increased on the base side of the projected portion 95 of the center post 94. Thus, since suppression of magnetic flux by magnetic saturation is gradually decreased, the magnetic force applied with the radial component between these projected portions is gently increased due to closeness in the axial direction. That is, in and after the vicinity of the valve closing position, the magnetic force applied with the radial component supplements the axial thrust force.

Third Embodiment

Figure 10:
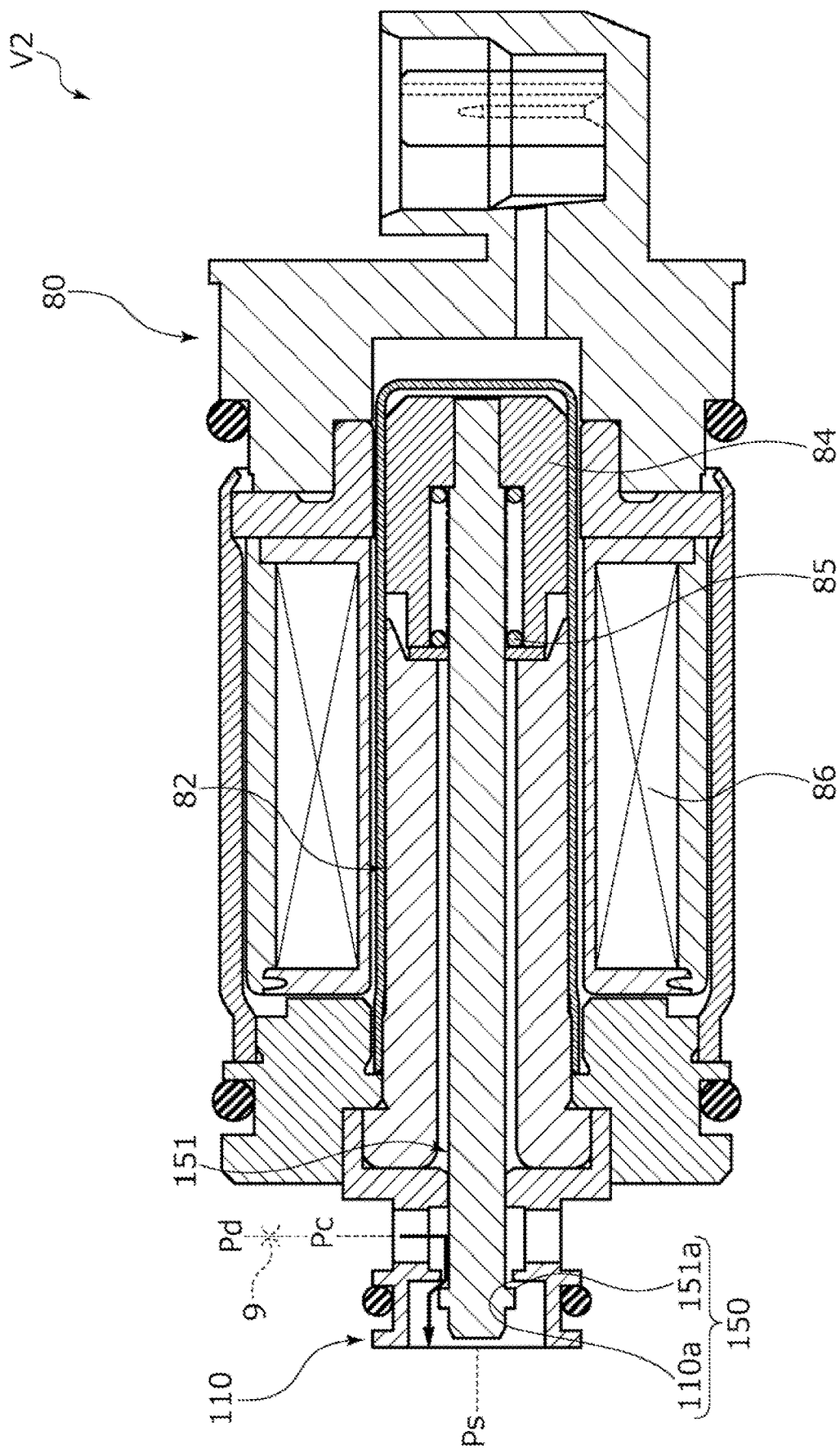
FIG. 10 is a sectional view showing a state where a CS valve is closed in an energized state (at the time of normal control) of a capacity control valve according to a third embodiment of the present invention.

A capacity control valve according to a third embodiment will be described with reference to FIG. 10. Duplicated description for the same configurations as the first embodiment is omitted.

In a capacity control valve V2, in a non-energized state, by pressing a movable iron core 84 to the axially right side by bias force of a coil spring 85, a CS valve element 151 is moved to the axially right side and an axially right side surface of a large diameter portion 151a of the CS valve element 151 is seated on a CS valve seat 110a, and a CS valve 150 is closed. In an energized state, that is, at the time of normal control, at the time of so-called duty control, by application of an electric current to a solenoid 80, by pulling the movable iron core 84 to the center post 82 side, that is, the axially left side, and moving the CS valve element 151 fixed to the movable iron core 84 to the axially left side together, the axially right side surface of the large diameter portion 151a of the CS valve element 151 is separated from the CS valve seat 110a of a valve housing 110, and the CS valve 150 is opened. FIG. 10 shows a state where the CS valve element 151 is moved to a maximum stroke position and the CS valve 150 is opened.

According to this, the capacity control valve V2 is formed of a normal close type in which the CS valve element 151 is biased in the valve closing direction of the CS valve 150 by the coil spring 85. Thus, as described above, in an opened state at the time of energization, a position of the CS valve element 151 is held only by electromagnetic force against the coil spring 85. The capacity control valve V2 of the present invention includes the opposing shape of the movable iron core 84 and the center post 82 as described above. Thus, since axial thrust force is strong at a valve opening position of the CS valve element 151, it is possible to reliably maintain the valve opening position of the CS valve element 151. Therefore, the configuration of the present invention is also useful for such a normal close type.

The embodiments of the present invention are described above with the drawings. However, specific configurations are not limited to these embodiments but the present invention includes changes and additions within the range not departing from the scope of the present invention.

For example, in the above embodiments, the projected portion 90 of the center post 82 among the two iron cores of the movable iron core 84 and the center post 82 is formed in a tapered shape. However, the present invention is not limited to this but the movable iron core may be formed in a tapered shape and an inner peripheral surface and an outer peripheral surface of the center post may be surfaces which are respectively parallel to the axial direction, or both the movable iron core and the center post may be formed in a tapered shape. In a case where both the movable iron core and the center post are formed in a tapered shape, the movable iron core and the center post are required to be tilted at angles different from each other with respect to the axial direction.

The distal end surface 90a serving as the effective magnetic force surface of the distal end of the projected portion 90 of the center post 82, the opposing surface 93 of the movable iron core 84, the opposing surface 91 of the center post 82, and the distal end surface 92a serving as the effective magnetic force surface of the distal end of the projected portion 92 of the movable iron core 84 are respectively not limited to the configuration to be formed at angles orthogonal to the axial direction but may be slightly tilted with respect to the orthogonal direction.

The inner peripheral surface 90b serving as a tilted surface which forms the tapered shape forming the projected portion 90 of the center post 82 and the outer peripheral surface 95b serving as a tilted surface which forms the tapered shape forming the projected portion 95 of the center post 94 are not limited to flat surfaces but may be formed in a curved surface shape.

The communication passage providing direct communication between the control chamber 4 and the suction chamber 3 of the variable displacement compressor M and the fixed orifice may not be provided.

The capacity control valve V, V2 has the configuration that the control pressure Pc in the control chamber 4 is adjusted by performing an action of opening and closing the CS valve. However, the present invention is not limited to this but, for example, a capacity control valve may perform normal control in which a DC valve provided between a discharge port through which a discharge fluid of discharge pressure Pd passes and a control port through which a control fluid of control pressure Pc passes is opened and closed to adjust control pressure Pc of a control chamber of a variable displacement compressor.

REFERENCE SIGNS LIST

1 Casing
2 Discharge chamber
3 Suction chamber
4a Cylinder
4 Control chamber
5 Rotating shaft
6 Swash plate
7 Piston
9 Fixed orifice
10 Valve housing
10a CS valve seat
50 CS valve
51a Axially left end
51 CS valve element
80 Solenoid
82 Center post (fixed iron core)
84 Movable iron core
85 Coil spring
86 Electromagnetic coil
90 Projected portion
90a Distal end surface (effective magnetic force surface)
90b Inner peripheral surface
91 Opposing surface (bottom surface of recessed portion)
92b Outer peripheral surface
92a Distal end surface (effective magnetic force surface)
92 Projected portion
93 Opposing surface (bottom surface of recessed portion)
94 Center post (fixed iron core)
95 Projected portion
95a Distal end surface (effective magnetic force surface)
95b Outer peripheral surface
95c Inner peripheral surface
96 Opposing surface (bottom surface of recessed portion)
110 Valve housing
110a CS valve seat
150 CS valve
151 CS valve element
E Effective magnetic force range
M Variable displacement compressor
V Capacity control valve
V2 Capacity control valve

The invention claimed is:

1. A capacity control valve in which a position of a valve element is changed by drawing a movable iron core to a fixed iron core with magnetic force generated in accordance with energization of an electromagnetic coil, wherein
one of the fixed iron core and the movable iron core includes a projected portion which is projected in an axial direction on a side of an outer peripheral surface of the one of the fixed core and the movable iron core, remaining one of the fixed iron core and the movable iron core includes a projected portion which is projected in the axial direction on a side of an inner peripheral surface of the remaining one of the fixed core and the movable iron core, the projected portions are capable of being loosely fitted to each other when the movable iron core is drawn to the fixed iron core, the projected portion of the one of the fixed iron core and the movable iron core is formed in a tapered shape so as to have, as a distal end surface thereof, an effective magnetic force surface which is smaller than an opposing surface of the remaining one of the fixed iron core and the movable iron core, the opposing surface facing the effective magnetic force surface, and the capacity control valve is of a normal open type to be brought into an opened state upon non-energization of the electromagnetic coil.

2. The capacity control valve according to claim 1, wherein the one of the fixed iron core and the movable iron core has a tilted surface forming the tapered shape of the projected portion thereof, and the tilted surface is not parallel to an outer peripheral surface of the projected portion of the remaining one of the fixed iron core and the movable iron core.

3. The capacity control valve according to claim 1, wherein the outer peripheral surface of the projected portion of the remaining one of the fixed iron core and the movable iron core is parallel to the axial direction.

4. The capacity control valve according to claim 1, wherein the effective magnetic force surface of the one of the fixed iron core and the movable iron core and the opposing surface of the remaining one of the fixed iron core and the movable iron core are formed to be orthogonal to the axial direction.

5. The capacity control valve according to claim 1, wherein the one of the fixed iron core and the movable iron core has a tilted surface forming the tapered shape of the projected portion thereof, and the tilted surface is formed so as to face an outer peripheral surface of the projected portion of the remaining one of the fixed iron core and the movable iron core.

6. The capacity control valve according to claim 1, wherein the one of the fixed iron core and the movable iron core has a tilted surface forming the tapered shape of the projected portion thereof, and the tilted surface is formed on an outer peripheral side so as not to face an outer peripheral surface of the projected portion of the remaining one of the fixed iron core and the movable iron core.

7. A capacity control valve in which a position of a valve element is changed by drawing a movable iron core to a fixed iron core with magnetic force generated in accordance with energization of an electromagnetic coil, wherein one of the fixed iron core and the movable iron core includes a projected portion which is projected in an axial direction on a side of an outer peripheral surface of the one of the fixed core and the movable iron core, a remaining one of the fixed iron core and the movable iron core includes a projected portion which is projected in the axial direction on a side of an inner peripheral surface of the remaining one of the fixed core and the movable iron core, the projected portions are capable of being loosely fitted to each other when the movable iron core is drawn to the fixed iron core, the projected portion of the one of the fixed iron core and the movable iron core is formed in a tapered shape so as to have, as a distal end surface thereof, an effective magnetic force surface which is smaller than an opposing surface of the remaining one of the fixed iron core and the movable iron core, the opposing surface facing the effective magnetic force surface; and the projected portion of the remaining one of the fixed iron core and the movable iron core is formed in a shape of equal width including a leading end surface which extends in a direction perpendicular to an axial direction and an outer peripheral surface which is continuous to the leading end surface and forms a surface parallel to the axial direction.

8. The capacity control valve according to claim 2, wherein the outer peripheral surface of the projected portion of the remaining one of the fixed iron core and the movable iron core is parallel to the axial direction.

9. The capacity control valve according to claim 2, wherein the effective magnetic force surface of the one of the fixed iron core and the movable iron core and the opposing surface of the remaining one of the fixed iron core and the movable iron core are formed to be orthogonal to the axial direction.

10. The capacity control valve according to claim 3, wherein the effective magnetic force surface of the one of the fixed iron core and the movable iron core and the opposing surface of the remaining one of the fixed iron core and the movable iron core are formed to be orthogonal to the axial direction.

\* \* \* \* \*